No. 702,329. Patented June 10, 1902.
J. POLIAKOFF.
PHOTOMETRIC RECORDER AND INDICATOR.
(Application filed July 18, 1900.)
(No Model.) 4 Sheets—Sheet 1.
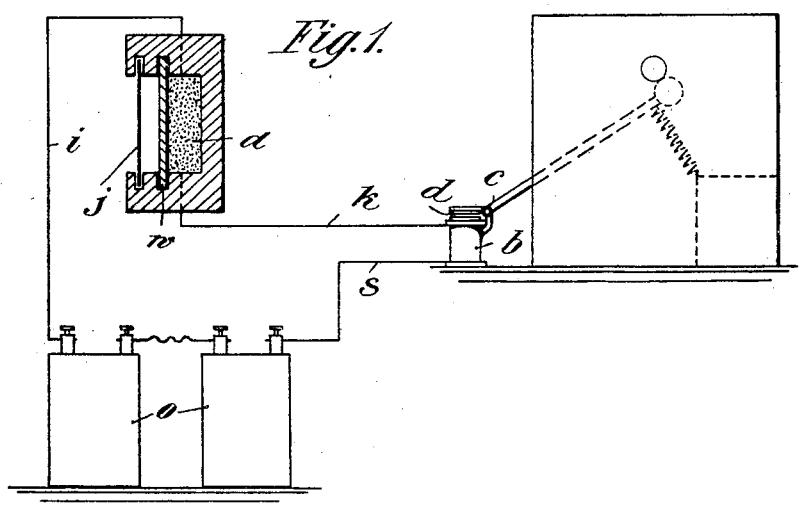
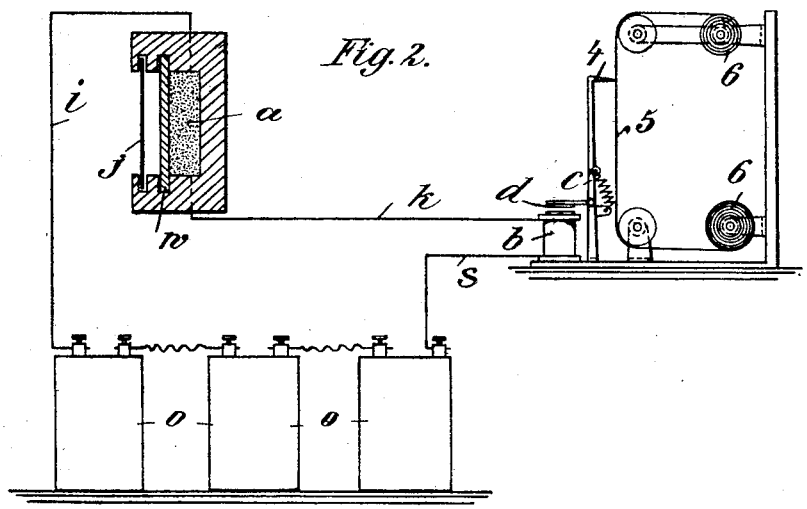

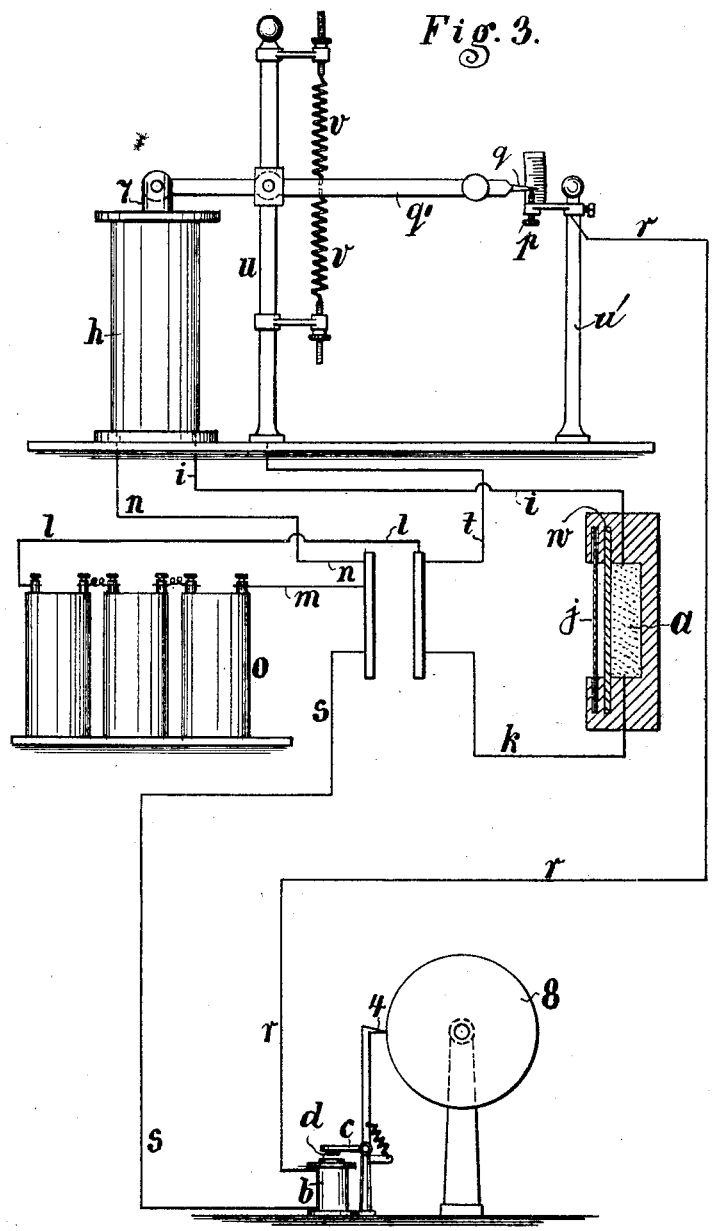

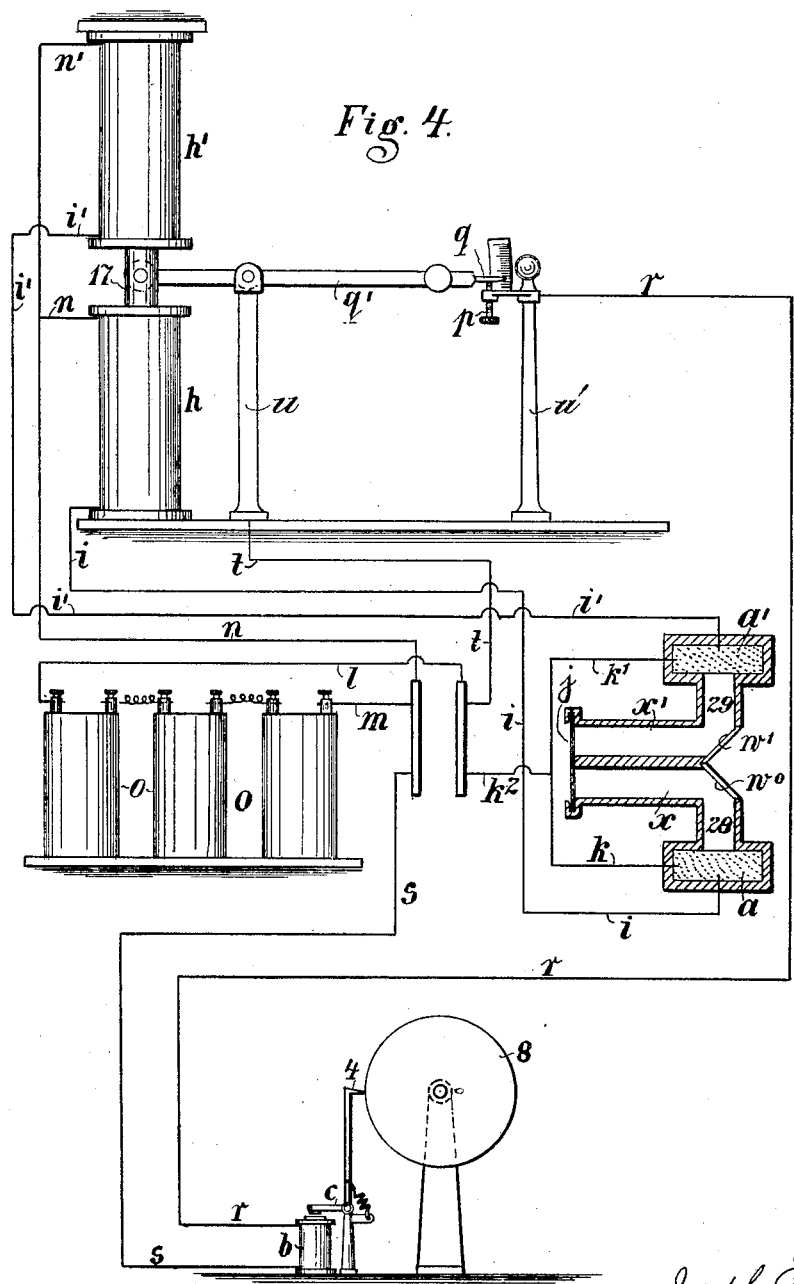

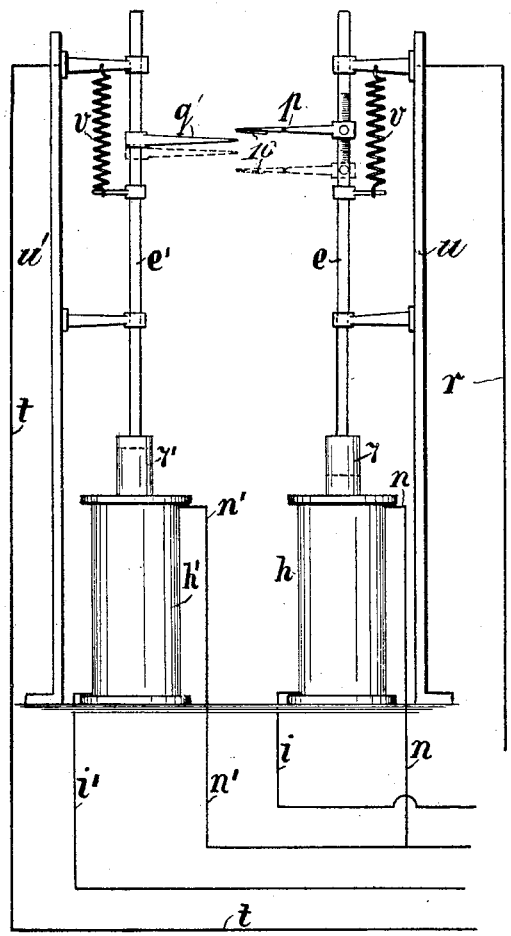

UNITED STATES PATENT OFFICE.

JOSEPH POLIAKOFF, OF CHARLOTTENBURG, NEAR BERLIN, GERMANY.

PHOTOMETRIC RECORDER AND INDICATOR.

SPECIFICATION forming part of Letters Patent No. 702,329, dated June 10, 1902.

Application filed July 18, 1900. Serial No. 24,078. (No model.)

*To all whom it may concern:*

Be it known that I, JOSEPH POLIAKOFF, a subject of the Emperor of Russia, residing at Charlottenburg, near Berlin, Germany, have invented certain new and useful Improvements in Photometric Indicating and Recording Devices; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention relates to photometric instruments by which the relative intensity of light is measured or compared with a standard and includes electrically-operated devices for visibly indicating such intensity and embraces that class of instruments denominated as "photometers," "actinometers," "actinographs," "exposure-meters," and the like, and has for its object the measuring of the intensity or duration of illumination by means of a photo-electric cell or resistance included in an auxiliary circuit and an auxiliary indicating device as means for making a permanent measurable record of the same or for operating exposure mechanism, which will be particularly described in the following specification and pointed out in the claims.

Referring to the drawings, in which like parts are similarly designated, Figure 1 shows a diagrammatic view of a photo-electric cell for operating a visible signal. Figs. 2 and 3 are similar views showing a chronogram and its inscribing mechanism. Figs. 4 and 5 show modifications of circuit-closing devices to be used with the photometric selemium-cells.

Referring to Figs. 1 and 2, which show the invention in its simplest form, $a$ indicates the photo-electric resistance, and I use, preferably, selenium inclosed in a suitable casing and in front of this cell place a sensitized glass plate $w$ or other transparent carrier which has on its surface a sensitized film that will be darkened by light and cover both plate and cell by a curtain or shutter J or equivalent device. The cell $a$ is connected by a wire $i$ to one pole of a source of electricity $o$ and by another, $k$, to an electromagnet $b$ and the latter by wire $s$ to the other pole of the battery $o$ or other source of electricity. The armature $d$ is attached to a movable spring-held arm $c$, which in Fig. 1 carries on its end an indicating device, in this case a visible signal, (indicated in dotted lines,) or, as in Fig. 2, a stylus 4, which latter traces a line on a traveling ribbon 5, wound from one of the spools 6, said spools 6 being driven by any suitable driving mechanism. (Not shown.)

The operation will be as follows: In order to measure the intensity of light, the shutter $j$ is removed. The light passing through the sensitized glass plate $w$ will render the selenium-cell $a$ conductive, so that current will flow through the circuit $o\ i\ a\ k\ b\ s\ o$, energize the magnet $b$, attract its armature, and operate the signal or remove the stylus 4 from the moving chronogram 5, thus making a hiatus in the latter, which is a measure of the relative intensity of the light, say, compared to that of a standard candle obtained in the same manner. On exposure of the plate $w$ the film begins to darken and becomes more and more opaque, gradually cutting off the light, and thereby increasing the resistance of the cell, whereby current is cut off from the magnet $b$ and the parts restored to normal position. The current passing the selenium-cell $a$ would in most instances be too much weakened for energizing the electromagnet. Therefore preferably a special circuit is employed for the electromagnet, which circuit is opened and closed by the alterations of the electric force in the first circuit. This is arrived at by means of a relay consisting of a solenoid $h$, which is included in the circuit of the battery $o$ and the selenium-cell $a$.

In Fig. 3 I have shown an indicating device consisting of a recording-cylinder 8 and stylus 4. A lever $q'$, balanced by adjustable springs $v$, is pivotally mounted on a standard $u$, connected to wire $t$, one end of said lever engaging with one end of an adjusting-screw contact $p$, connected with the wire $r$ and connected at its other end with the movable core 7 of the relay. The batteries $o$ are connected to two branches or lines in parallel, one of them containing the circuit-breaker $pq$ and recording instrument $b\,c\,d\,8$ and the other the electromagnet or relay $h$, operating the circuit-breaker and the selenium-cell $a$ in series therewith. This being a divided circuit, that branch which contains the cell $a$ and solenoid $h$ being of higher resistance than the other branch which contains the circuit-breaker $q$ and recorder the greater part of the current will flow through the low-resistance circuit, thereby maintaining the electromagnet $b$ of the recorder energized, holding the armature $d$ in contact with the magnet-core and the stylus off the drum 8, that carries the paper on which the record is made. If now the shutter $j$ of the cell is opened, light passing through the sensitized plate $w$ will affect the cell $a$, decrease its resistance, and thereby allow more current to pass through the solenoid $h$ to sufficiently energize it to draw in the magnet 7, break the contact between $p$ and $q$, and throw the entire battery-current into the solenoid-circuit $o\,m\,n\,i\,a\,k\,l\,o$, while the recorder-circuit $o\,m\,s\,b\,r\,p\,q\,u\,t\,l\,o$ is broken, the armature $d$ of the magnet $b$ is released, and the stylus brought by the spring against the recording-cylinder 8. Instead of making a hiatus in a continuous record, as in Fig. 2, the stylus in this case makes a line the length of which indicates the relative intensity of the light. The circuit-breaker $q$ may also be used as a visible signal as to the duration of the interval, which indicates the intensity of the light, and the recorder may be substituted by or included at the same time in the circuit with the devices shown in Figs. 4 and 5.

In Fig. 4 I have shown an arrangement including two cells $a$ and $a'$, a photographic shutter, and a pair of solenoids $h$ and $h'$, each being included with a cell in a subbranch. In this arrangement instead of a single solenoid I use the two solenoids $h$ and $h'$, acting upon a common magnetic core 17, movable into and out of each magnet, thus producing a differential action, and any other differentially-acting magnetic mechanism may be used. These magnets are included in two subbranches in parallel with one another, each of which branches contains a selenium-cell; but these cells are not arranged as before described. These two cells $a$ and $a'$ are arranged opposite to or beside one another, to each of which is admitted light through a tube $x$ or $x'$, one part of which, 28 or 29, is bent at right angles to the main part and leads directly to the selenium without the interposition of a sensitive glass $w$; but in place of this glass I use similar devices, as reflectors $w'$ and $w^0$, which reflect the light coming from the entrance of the tube $x$ or $x'$ through the tubes 28 29 to the cells $a$ and $a'$. One of these reflectors $w'$ is not provided with a sensitive surface, but is arranged so that light is reflected from a paper of predetermined color and not sensitive to light. The other reflector $w^0$ is provided with a sensitized paper, and the amount of light reflected therefrom is not constant, but decreases with the increasing color of the paper. In this arrangement it is very easy to control the speed of the circuit-breaker by changing the non-sensitive paper at $w'$ and using either a lighter or darker shade. Current from batteries $o$ goes by wire $l$, branch wire $k^2$, subbranches $k$ and $k'$ to the cells $a$ and $a'$, by wires $i$ and $i'$ to the respective solenoids $h$ and $h'$, and by common return-wires $n$ and $m$ to the batteries. The second circuit in parallel with those just traced is by wires $l$ and $t$ to standard $u$, circuit-breaker $q$, adjustable contact $p$, wire $r$ to magnets $b$ to operate a shutter-closing device and by return-wires $s$ and $m$ to the batteries $o$. The solenoid $h'$ acts on the core with a continuously equal yet small power, since on the cell $a'$ by means of the dark-colored paper $w'$ only a very weak light is reflected, while the solenoid $h$ acts with great power on the core as long as the sensitive paper $w^0$ is white, and therefore reflects relative a great amount of light on the cell $a$. When the paper $w^0$ by the continued action of the light has become so much colored and as dark as the paper $w'$, the action of the light on the cell $a$ will be reduced to the same degree. The consequence is that the current passing the solenoid $h$ has become as weak as the current passing the solenoid $h'$. The magnetic lines of force of both solenoids will be equal, and therefore the core will assume its middle position and will permit the lever $q$ to contact with the screw $p$, so that by means of the electromagnet the stylus 4 is released. When using this device as a photometer to measure artificial light, each of the reflectors $w'$ and $w^0$ may be replaced by sensitized plates or paper, as before described, one of said plates adapted to be affected by light from a standard of comparison—say a standard candle—and the other by the light to be measured.

Instead of solenoids arranged as in Fig. 3 or Fig. 4, with a single movable contact-arm, two solenoids can be used side by side, as $h$ and $h'$, as shown in Fig. 5, each provided with a core 7 and 7', suspended from conductive rods $e$ and $e'$, which latter are hung by springs $v$ and $v'$ from standards $u$ and $u'$. Each rod $e$ and $e'$ carries a contact $p$ and $q$. The former, $p$, is adjustable to a scale along its rod $e$ and carries on its under side an insulating-strip 10, so as to prevent contact with the arm $q$ on this side, and in order to allow the arm $p$ to pass the arm $q$ the former is made yielding, so as to be drawn past the latter. Only on the upward movement of the arm $q$ contact is established when the resistance of the cell $a$ has sufficiently increased and the energy of the magnets has sufficiently decreased. The same wires and circuits will be used as described in connection with Fig. 3 or Fig. 4.

Having thus described my invention, what

I claim as new therein, and desire to secure by Letters Patent, is—

1. In combination with a source of electricity and an electromagnet; a photo-electric resistance in circuit with said magnet and an indicating device operated by the latter, substantially as set forth.

2. The combination with a source of electricity and an electrically-operated indicating device; of a photo-electric resistance in circuit with said electrically-operated indicating device, and means for reducing the light passing to said resistance, substantially as set forth.

3. The combination with a source of electricity and an electrically-operated stylus arranged to trace a record; of a selenium-cell in series in the stylus-operating circuit, and a removable actinic covering for said cell, substantially as set forth.

4. In combination with a source of electricity, a branch circuit, a recording instrument and a switch in said circuit, a second branch circuit, a photo-electric resistance and electrical means for operating said switch included in said second circuit, whereby current is interrupted through the first branch circuit, substantially as described.

5. In combination with a photo-electric resistance, a sensitized medium arranged to reduce light admitted to said resistance, substantially as set forth.

6. In combination with a photo-electric resistance, a sensitized medium arranged to send light to said resistance in decreasing intensity, substantially as set forth.

7. In combination, a selenium-cell, a sensitized medium arranged to reflect light to said cell, substantially as and for the purpose set forth.

8. In combination, a pair of selenium-cells, a reflector arranged to concentrate light on one of said cells, and a reflector sensitive to light arranged to reflect light to the other, substantially as set forth.

9. In combination in an electric circuit, a pair of selenium-cells, a reflector of predetermined reflecting power arranged to direct light to one of said cells, and a removable sensitized medium arranged to reflect light to the other, substantially as set forth.

10. In combination in an electric circuit, a pair of selenium-cells, a reflector sensitive to light and directing rays to said cells, and means for admitting light from different sources, substantially as and for the purpose set forth.

11. In combination, a selenium-cell, a tube admitting light to a non-variant reflector, a second reflector receiving light from the first, sensitive to light and arranged to reflect said light to the cell, substantially as and for the purpose set forth.

12. In a photometer in combination, a photo-electric cell, a source of electricity and a solenoid, all suitably electrically connected and a circuit-breaker operated by said solenoid, substantially as set forth.

13. In combination, a photo-electric cell, a tube admitting light to a non-variant reflector, arranged at an angle to said tube and cell to reflect light sent through the former to the latter; a second tube and photo-electric cell and a reflector sensitive to light arranged to reflect light sent through the second tube to the second cell, electrical connections, and means for indicating the relative intensity of the light, substantially as set forth.

14. In a photometer, the combination with a source of electricity, of a selenium-cell and a solenoid connected in series in one circuit, a circuit-breaker actuated by said solenoid and a recording instrument in a parallel circuit, substantially as set forth.

15. In a photometer, the combination with a source of electricity, of a pair of solenoids connected in parallel and a selenium-cell in one circuit; a circuit-breaker actuated by said solenoids and a recording device in another parallel circuit, substantially as set forth.

16. In a photometer, the combination with a source of electricity, of a pair of electromagnets, a photo-electric cell and a comparison photo-electric cell in one circuit, and a circuit-breaker operated by said magnet and electrically-operated indicating device in a branch circuit, substantially as set forth.

17. In a photometer, the combination with a source of electricity, of a pair of electromagnets, a standard and a comparison photo-electric cell in one circuit, and a contact moved by each magnet, and a suitable indicating device in a branch circuit, substantially as set forth.

18. In a photometer, the combination with a source of electricity, of a pair of solenoids each arranged to operate a spring-suspended contact, said contacts arranged to have their ends close circuit, and a standard and a comparison photo-electric cell in one circuit and said contacts, and a recording device in a branch circuit, substantially as set forth.

In testimony that I claim the foregoing as my invention I have signed my name in presence of two subscribing witnesses.

JOSEPH POLIAKOFF.

Witnesses:
 MAS. C. STAEHLER,
 WOLDEMAR HAUPT.